United States Patent [19]

Smith

[11] 3,962,474

[45] June 8, 1976

[54] OLIVE STUFFING METHOD

[75] Inventor: William W. Smith, Santa Clara, Calif.

[73] Assignee: FMC Corporation, San Jose, Calif.

[22] Filed: May 31, 1974

[21] Appl. No.: 475,325

Related U.S. Application Data

[63] Continuation-in-part of Ser. No. 228,334, Feb. 22, 1972, abandoned, which is a continuation-in-part of Ser. No. 16,832, March 5, 1970, abandoned.

[52] U.S. Cl. ............................ 426/282; 426/640; 426/455; 426/464; 426/473; 426/485
[51] Int. Cl.² ....................................... A23B 7/02
[58] Field of Search ......... 426/282, 284, 342, 384, 426/377, 378, 397, 402, 443, 455, 464, 465, 466, 478–479, 481–485, 615, 640, 518; 99/494

[56] References Cited

UNITED STATES PATENTS

| | | | |
|---|---|---|---|
| 1,672,718 | 6/1928 | Graefe | 426/484 |
| 1,852,941 | 5/1932 | Stewart | 426/379 |
| 1,937,416 | 11/1933 | Smith | 426/482 |
| 2,567,590 | 9/1951 | Ashlock | 99/494 |
| 2,578,496 | 12/1951 | Ashlock | 426/282 |
| 3,188,750 | 6/1965 | Davis | 426/384 |

*Primary Examiner*—Norman Yudkoff
*Assistant Examiner*—Martin G. Mullen
*Attorney, Agent, or Firm*—C. E. Tripp; R. S. Kelly; J. W. Edwards

[57] ABSTRACT

Pitted olives are stuffed with an edible food that has been dried to facilitate its handling, and the dried food is reconstituted within the pitted olives by packing the stuffed olives in an aqueous solution. Drying an edible food, such as pimiento, is carried out to cause an increase in stiffness and a drying of the surface texture to permit gripping of the food without slipping. Also, a reduction in size will accompany the drying of the food particularly if air drying is used. With this reduced size condition of the food, greater clearance can be allowed between the walls of the olive pit cavity and the sides of the food to be inserted since the food will swell to a tight fit within the pit cavity upon subsequent reconstitution. The stiffness of the dried food will be greater than that of the olive adjacent the walls of the pit cavity so that the walls of the pit cavity will deflect outwardly to receive the dried food if the dried food is somewhat oversized or slightly out of alignment. Such an olive stuffing method is suitable for a mechanized operation with an olive stuffing machine that includes a spiral cutting blade with a helical configuration for simultaneously slicing dried pimiento held in a feed cartridge and advancing the pimiento for the next cut. A synchronized pusher stuffs the sliced pimiento into aligned pitted olives before the olives are placed in a salt water solution. Alternately, the slicing step and cutting blade can be dispensed with if the edible food is precut to a size for stuffing or is an individual item of a size suitable for stuffing.

7 Claims, 10 Drawing Figures

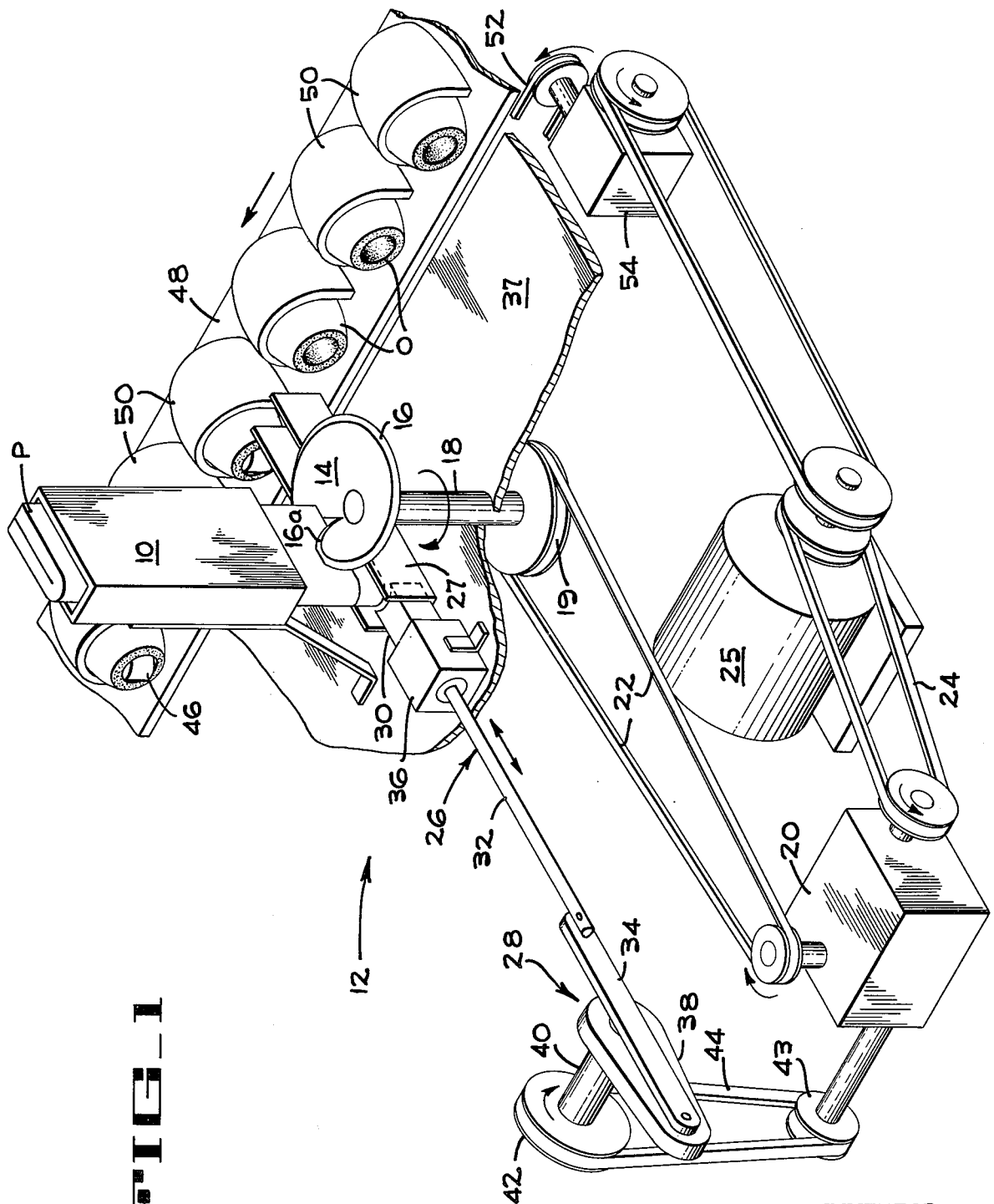

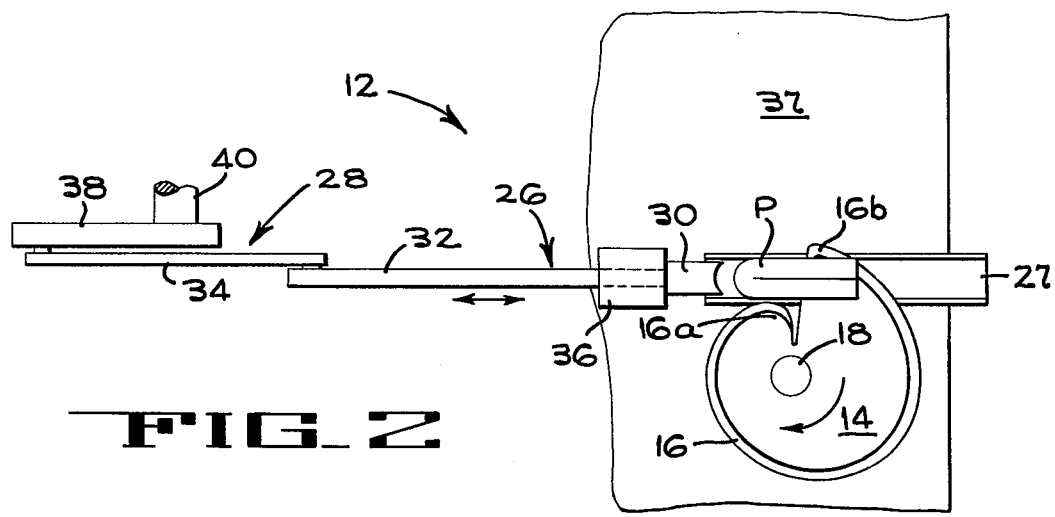
FIG_2
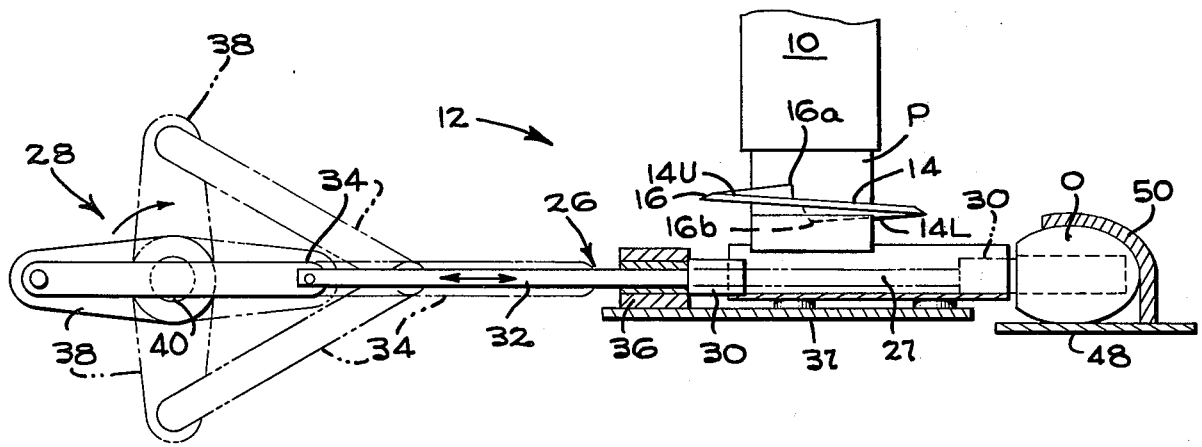
FIG_3

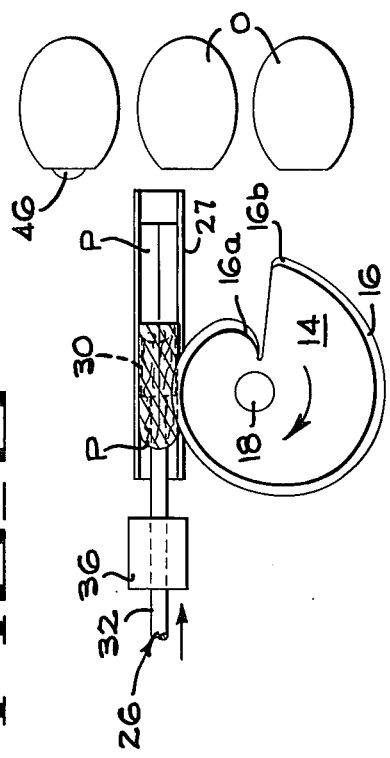
FIG_4
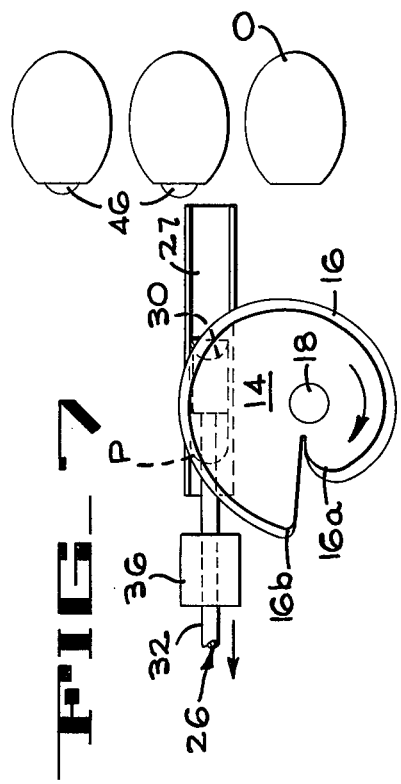
FIG_5
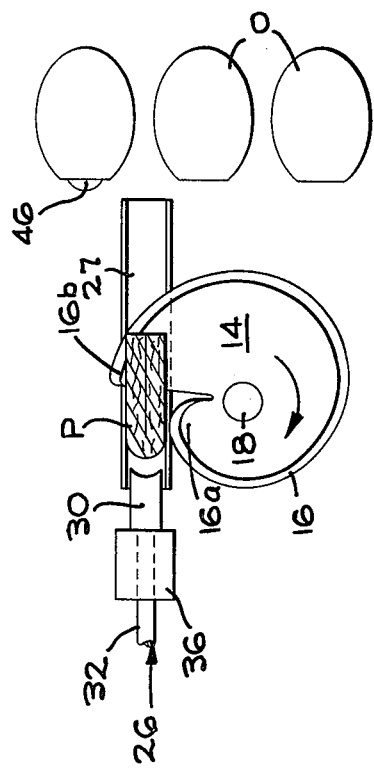
FIG_6
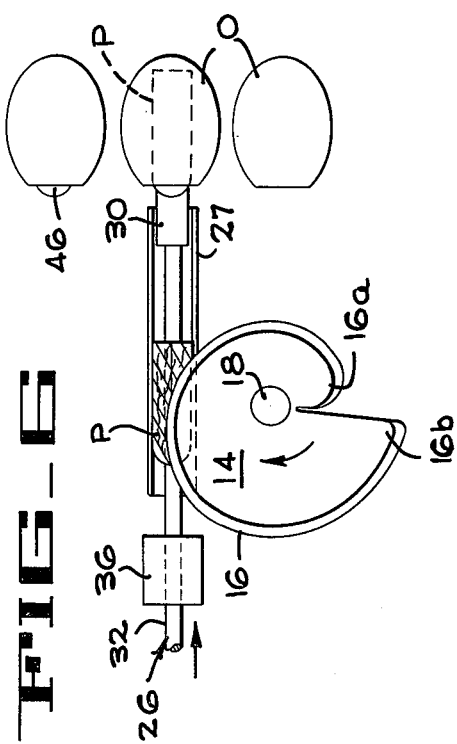
FIG_7

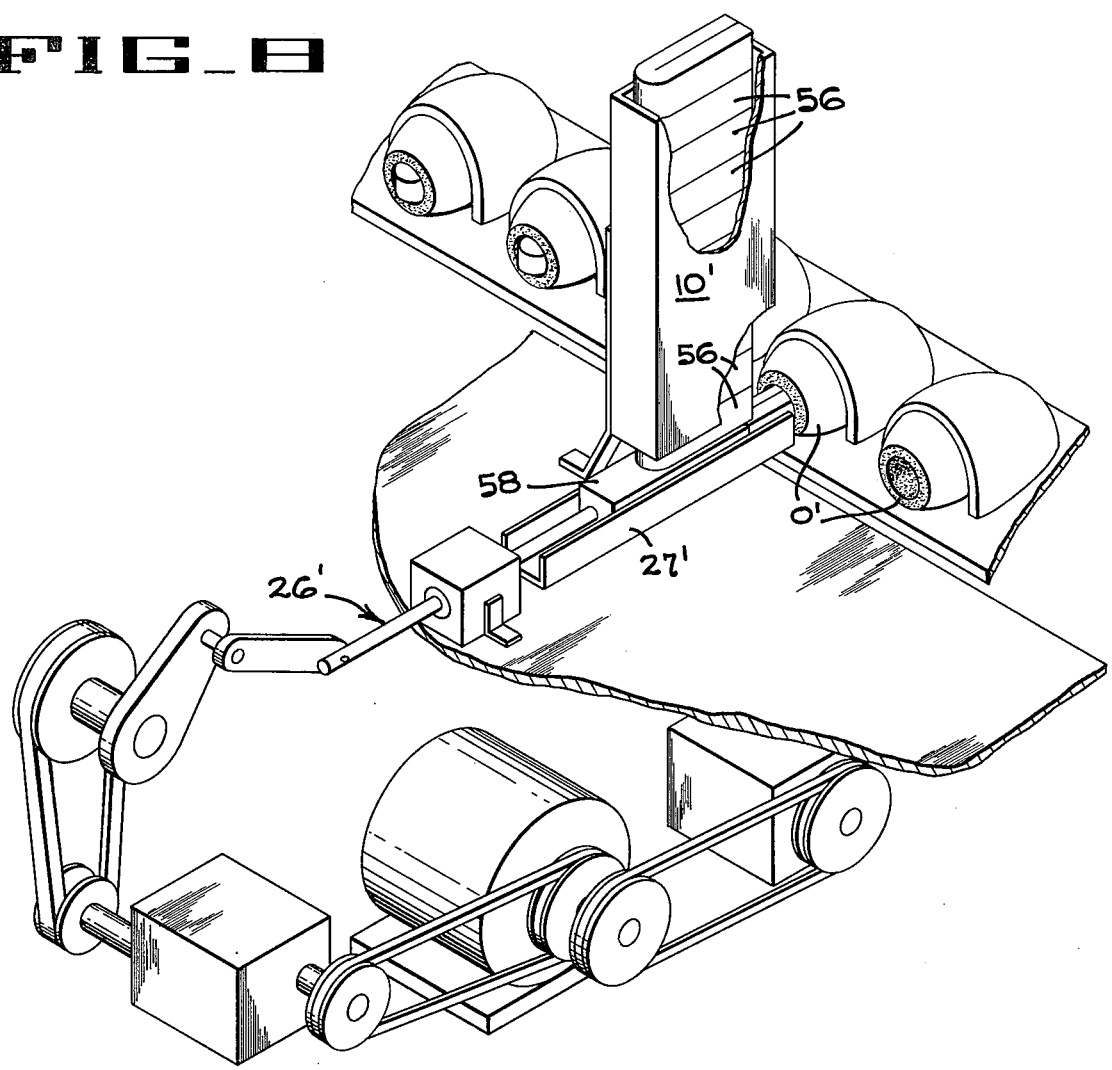
FIG_8
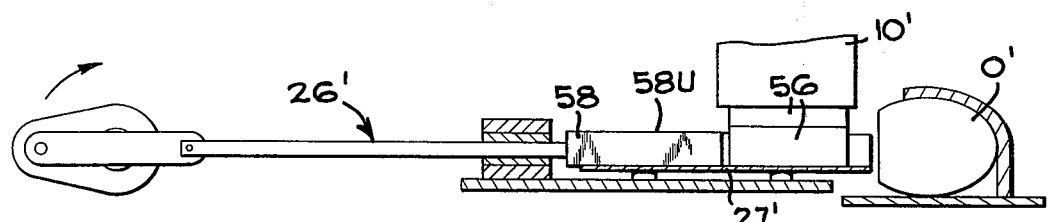
FIG_9
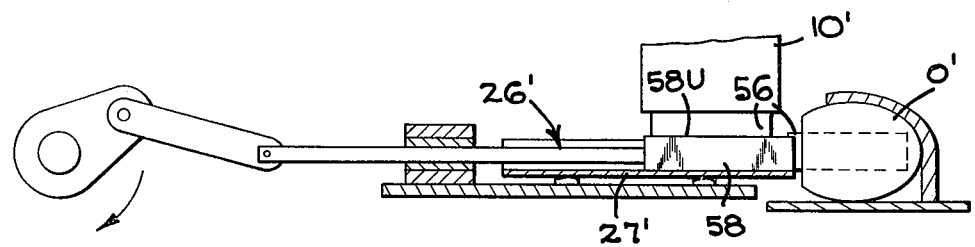
FIG_10

OLIVE STUFFING METHOD

CROSS-REFERENCE TO RELATED APPLICATION

This application is a continuation-in-part of my copending application Ser. No. 228,334 (now abandoned), filed Feb. 22, 1972, which latter application was a continuation-in-part of application Ser. No. 16,832 (now abandoned), filed Mar. 5, 1970.

BACKGROUND OF THE INVENTION

1. Field of the Invention

This invention relates to the stuffing of pitted olives with edible food, and more particularly, it pertains to an olive stuffing method that is suitable for a mechanized olive stuffing operation.

2. Description of the Prior Art

Prior to the present invention the only feasible procedure for stuffing olives has been by hand. Hand stuffing requires a worker to pick up a pitted olive and insert, usually with a specially designed hand tool, a folded strip of edible food, such as pimiento, into the pit cavity. A folded strip of pimiento has a slippery texture, is rather moist, and is very difficult to guide into the small cavity; therefore, several attempts at stuffing a single olive are frequently necessary. It is apparent that due to the time consuming manual process and the cost of labor, hand stuffing is very expensive and, in some labor markets, uneconomical.

Attempts have been made at automating or mechanizing the olive stuffing process, but to the applicant's knowledge, no one has devised a machine that is capable of successfully and economically inserting pimiento pieces or other pieces of edible food into the small cavity of a pitted olive. The pimiento is hard to handle because of its flexibility and slippery texture. The size of the pimiento should be sufficient to fill the pit cavity of an olive, and, because of the pimiento size and flexibility, it is very difficult to stuff into the small pit cavity of the olive.

U.S. Pat. Nos. 1,502,929 and 2,351,788 disclose an operation for filling pitted olives mechanically with a flowable stuffing material, such as a pimiento paste, that sets to a jelly form within the pit cavity of an olive.

U.S. Pat. No. 2,578,496 teaches an apparatus and a method for comprising pimiento into sheets having uniform thickness and cut into strips for stuffing. Other prior art patents that disclose systems for mechanically stuffing strips of pimiento into pitted olives, such patents including U.S. Pat. Nos. 2,567,590; 2,597,933; 2,609,853 and 2,637,653.

Paste stuffing of olives has been found to be generally unsatisfactory because if the paste is made stiff enough to remain in the olive, it flows slowly and is difficult to handle. Then, after the olives have been stuffed, the paste usually works out of the olive pit cavity. If the olives are to be stuffed with strips of pimiento, the conventional hand operation is slow and expensive and machine operation has heretofore not been reliable because of the difficulties involved in handling the slippery and flexible pimiento.

SUMMARY OF THE INVENTION

An object of the present invention is to provide a method whereby an edible food that is normally flexible and slippery can be readily stuffed into the pit cavity of an olive in a quantity sufficient to fill the pit cavity and in a manner so that it will substantially possess its normal qualities when the olive is ready for eating. It has been found that by drying an edible food, such as pimiento, the stiffness thereof is increased and its surface texture is modified so as to permit gripping thereof without slipping. Thus, such a method includes the steps of drying the edible food to facilitate its handling when stuffing into pitted olives, stuffing the edible food into the pit cavities of olives, and reconstituting the dried food within the pitted olives by packing the olives and dried food in an aqueous solution.

An olive stuffing method that includes the steps of drying the edible food, stuffing the edible food into the pit cavities of olives, and reconstituting the dried food by packing the olives in an aqueous solution is particularly suitable for a mechanized stuffing operation with a machine that slices the dried food into strips and pushes the strips into the pit cavities of olives moving along on a conveyor because the drying facilitates handling of the edible food during the slicing and stuffing steps. The extent of drying necessary to facilitate handling depends upon the character of the food being dried and the particular handling characteristics desired. In the case of pimiento, drying to a moisture content of less than 20% facilitates such handling characteristics; however, a moisture content of approximately 13% at the time of stuffing is most desirable. If desired, the drying process can be carried out so as to reduce the moisture content of the product to less than 5% for storing the food without spoilage, and before stuffing, the moisture content can be elevated to 13% by rehumidification.

BRIEF DESCRIPTION OF THE DRAWINGS

FIG. 1 is a perspective view of an olive stuffing apparatus with parts broken away for clarity and illustrating how an olive stuffing operation can be mechanized with the method of the present invention.

FIG. 2 is a fragmentary plan view of the apparatus of FIG. 1 to illustrate the spiralling feature of the cutting blade.

FIG. 3 is a fragmentary side elevation with parts in section, of the apparatus of FIG. 1 to illustrate the helical configuration of the cutting blade.

FIGS. 4, 5, 6 and 7 are operational views in plan of the apparatus of FIG. 1 to show the synchronization between the cutting blade and the pusher.

FIG. 8 is a perspective view of another olive stuffing apparatus with parts broken away for clarity.

FIGS. 9 and 10 are fragmentary side elevation operational views of the apparatus shown in FIG. 8 illustrating the functioning of the pusher.

DESCRIPTION OF THE PREFERRED EMBODIMENT

In preparing pimiento P for use in accordance with the present invention, raw pimiento is cored and laid open before it is put through conventional washing and blanching processes. After being so treated, the individual pimiento pieces are arranged in a line with the adjacent pieces in overlapping relationship, and the entire strip of pimientos is then folded over upon a longitudinally extending line. The individual pimientos may be initially dried individually in a flat position until their moisture content is approximately 60% prior to the folding and overlapping in order to speed up the overall drying process.

The drying of the pimiento strip can then be performed in various ways such as by heat drying, air blast drying, vacuum drying, a combination of heat and vacuum drying, freeze drying, and osmotic drying with salt. The type of drying to be used would depend upon the character of the food being dried and the particular characteristics desired in the dried product. Even in a given type of food, such as pimientos, there can be a considerable variance in the characteristics, e.g., in the initial salt content, which might require different types of drying techniques.

In the dried condition, a smaller piece of edible food can usually be used for stuffing, thus allowing a greater clearance between the walls of the pit cavity and the sides of the food being inserted, since the dried food will normally swell to a tight fit within the pit cavity upon reconstitution. The stiffness of the dried food should be increased to a point where the olive adjacent the pit cavity walls will deflect to receive the dried food if it is somewhat oversized or out of alignment. A greater size reduction is achieved by drying a product by heat or air blast drying than by freeze drying because in the former process the product shrinks proportionally with the moisture removed while in the latter process the product substantially maintains its original size as the moisture is removed in vapor form. In the case of pimiento, which contains approximately 70% moisture in its fresh state prior to drying, size reduction by heat or air blast drying can reduce the size of the pimiento to approximately ½ of its original size.

It has been found that pimiento with a moisture content of about 2% to about 13% by weight at the time of slicing and stuffing has the most desirable handling characteristics; however, it may be preferred to dry the pimiento to a moisture content of less than 5% so that the dried pimiento can be stored without spoilage. Later, the moisture content of the pimiento can be raised by rehumidification, if necessary, before using the pimiento for stuffing olives. The preferred moisture content after drying will depend largely upon the salt content in the pimiento (the higher the salt content, the higher the required moisture content); however, the moisture content should generally be held to 20% or less by weight in order to insure ease in handling the final dried pimiento strip in the mechanical slicing and stuffing apparatus to be described hereinafter.

The dried pimiento meat, after being dried by any of the known techniques, is first trimmed into a rectangular shape with the aforementioned fold extending in the longitudinal direction, and, in the olive stuffing apparatus illustrated in FIGS. 1 to 7, the folded pimiento strip P is placed in a feed cartridge 10 (FIG. 1) of a stuffing apparatus 12 so as to protrude from the bottom thereof.

When the pimiento is freeze dried, the pimiento meat is very stiff and brittle when first removed from the freeze-dry apparatus, but readily absorbs moisture from the atmosphere and becomes desirably textured and easy to work with. The cartridge 10 is a rectangular box having its two opposite ends open and being adapted to guide the pimiento as it is advanced, by means disclosed below, longitudinally through the cartridge.

The stuffing apparatus 12 includes a unique rotary cutting disc 14 disposed beneath the cartridge 10 and in partially underlying relationship with the dried pimiento P protruding from the bottom opening of the cartridge. The cutting disc 14 is rigidly fixed on the upper end of a vertical rotating shaft 18 which shaft has its longitudinal axis laterally spaced from but parallel to the folded pimiento P. The lower end of the shaft 18 carries a fixed drive pulley 19 which is linked to a gear housing 20 by a V-belt 22. The gears in housing 20 are driven through V-belt 24 by a motor 25.

The cutting disc 14 when viewed in plan as in FIG. 2, can be seen to have a spiral cutting edge 16. The cutting edge 16 begins at 16a with a small radius and spirals outwardly to its largest radius at its terminus 16b. The radius of the leading edge 16a is just sufficient to reach the nearest flat side of the laterally displaced pimiento P while the terminus 16b of the cutting edge has a radius sufficient to extend completely through the pimiento. As the disc 14 is rotated in the direction of the arrows in FIGS. 1, 2 and 4 to 7, the cutting edge 16 of the disc penetrates deeper into the pimiento, slicing from the flat side of the pimiento nearest to the shaft 18 through to the flat side furthest from the shaft.

As best seen in FIG. 3, the cutting edge 16 is also of helical configuration with the leading edge 16a of the cutting edge 16 above the terminal edge 16b. It is apparant that as the disc 14, which cannot move vertically, makes a complete revolution with the cutting edge 16 penetrating deeper into the pimiento P, the helical lower face 14L of the disc 14 will push downwardly on the pimiento P, advancing the pimiento downwardly through the pimiento cartridge 10. Therefore, as the terminal edge 16b is completing a cut through the pimiento, as best seen in FIGS. 2 and 3, the leading edge 16a is beginning a subsequent cut at a level above the cut being completed. Thus, each severed piece of pimiento will have a thickness equivalent to the vertical displacement of the leading edge 16a from the terminal edge 16b. The severed pieces of the pimiento drop into a chute 27 where they can be readily stuffed into pitted olives O which are sequentially passing in alignment with the chute 27 in a manner to be explained more fully later.

Synchronized and cooperating with the cutting disc 14 is a pimiento pusher 26. The pusher 26 is part of a crank mechanism generally designated 28 that is geared to have a time-cycle equivalent to that of the cutting disc 14. The pusher 26 has a head portion 30 for engaging the severed strips of pimiento P lying in the chute 27, and a push rod portion 32 that is pivotally connected to a rocking link 34. The push rod 32 of the pusher is slidably supported by a guide block 36, anchored to plate 37, to assure linear reciprocating movement of the pusher. The end of the link 34 not connected to the push rod is pivotally connected to one end of a crank arm 38 which has its opposite end fixedly secured to a rotating shaft 40. The shaft 40 is driven through pulleys 42, 43, V-belt 44 and gear housing 20, by the motor 25.

As shaft 40 rotates, the crank arm 38 is rotated causing link 34 to simultaneously rock up and down and back and forth effecting a linear reciprocating movement of the push rod 32 through the guide block 36. This reciprocating movement of the push rod causes the head 30 of the pusher 26 to slide back and forth in the chute 27. As seen in FIG. 3, in full line representation, when the head 30 of the pusher 26 is fully retracted, it will not obstruct the free fall of a severed strip of pimiento P into the chute 27, and in its fully extended position, shown in phantom lines in FIG. 3, it is disposed so that a strip of pimiento in front of the head will be fully stuffed into a pitted olive O with a desirable slight overhang as at 46 (FIG. 1).

As stated above, the cutting disc 14 and pusher 26 have the same time cycles and are synchronized to cooperatively sever strips of pimiento from that held in the cartridge 10 and stuff the severed strips into pitted olives O. This synchronization and cooperation is best illustrated by reference to FIGS. 4 to 7. In FIG. 4 the pusher 26 is fully retracted and the cutting disc is at the point in its cycle where the terminal edge 16b of the cutting edge 16 is just completing a cut through the pimiento P to drop a first pimiento strip into the chute 27, and the leading edge 16a is beginning a subsequent cut at a point higher up on the pimiento. The severed strip of pimiento drops into the chute 27 and is in position to be stuffed by the pusher 26 into an aligned and pitted olive O. When the disc has rotated through 90° as depicted in FIG. 5, the pusher head 30 has begun to move the severed pimiento strip along chute 27 toward the awaiting pitted olive. An additional 90° rotation of the cutting disc 14 leaves the elements in the position shown in FIG. 6, with the cutting edge 16 more than half way through the pimiento in the cartridge and the pusher fully extended having stuffed the severed strip of pimiento into the aligned olive. After an additional 90° rotation (FIG. 7) the next cut is almost completed and the pusher 26 is in its retracting stroke repositioning itself, to the position of FIG. 4, for the following cycle. It is seen that, as the cutting disc 14 passes through a complete revolution, the pusher 26 completes a full cycle and is repositioned to begin a subsequent identical cycle.

In operation, pimiento meat which has been cored, treated, folded and dried as discussed above is placed in cartridge 10 so as to protrude from the bottom thereof. Olives O which have been previously pitted and oriented so that their open ends are uniformly directed, are placed on a continuously driven conveyor belt 48 disposed so as to convey the olives on a path normal to the path followed by the pusher 26. The conveyor belt 48 has retainer caps 50 to hold the olives in their prearranged position. The conveyor belt 48 is continuously driven by the motor 25 and V-belt 52 through a gear box 54 and synchronized with the cutting disc 14 and pusher 26 so that a pitted olive is always aligned with the chute 27 as the pusher 26 completes its extending or stuffing stroke. In the event the stuffing apparatus 12 is adapted for use with a pitting machine, the belt 48 would, of course, be driven by the motor on the pitting machine which would of necessity need to be synchronized with the stuffing apparatus. The pusher 26 operates so rapidly that the pimiento can be stuffed into the olive without momentarily stopping each olive at the end of the chute 27.

On the first revolution of the cutting disc 14 a strip of pimiento is severed from the bottom thereof as described above. While the strip is being severed, the bottom surface 14L of the cutting disc is pushing the pimiento in the cartridge 10 downwardly thrus positioning it for the subsequent cut. It should be pointed out at this point that the pimiento remaining in the cartridge 10 is supported by the upper surface 14U (FIG. 3) of the cutting disc 14 at all times. Just as the severed strip of pimiento drops into chute 27, the pusher beings its extending stroke and stuffs the severed strip into the aligned olive O positioned at the end of the chute 27. As a subsequent strip of pimiento is being cut, the pusher 26 is retracted and the conveyor belt 48 continues to advance the next pitted olive into a position to be stuffed. This sequence is repeated until the desired number of olives have been stuffed. It is evident that the cartridge 10 can be replenished with folded pieces of dried pimiento as the stuffing process is continued so that the apparatus need be stopped only when the desired number of olives have been stuffed. Once the olives have been stuffed they are discharged from the conveyor belt 48 and conventionally packed in jars of salt water wherein the dried pimiento is reconstituted leaving the stuffed olive in the desired edible state.

A second embodiment of the apparatus, illustrated in FIGS. 8 to 10, is useful for stuffing olives with pre-cut pimiento or with other pre-cut edibles. This embodiment is also useful in stuffing olives with individual edibles such as almond nuts, pumpkin seed meats, anchovies, or the like. Referring first to FIG. 8, the apparatus there shown is similar to that of the apparatus of FIG. 1 with like parts given the same reference numeral with a prime suffix. The feed cartridge 10' is disclosed as containing in overlying relationship a plurality of aligned strips of pre-cut pimiento 56. The pimiento is cut small enough so that it is capable of sliding through the cartridge 10' due to the force of gravity only.

The pusher mechanism 26' is provided with a head portion 58, which is elongated with respect to the head portion 30 of the apparatus of FIG. 1, so as to support the pimiento 56 in the cartridge 10 through substantially an entire cycle. The operation of the pusher is best illustrated in FIGS. 9 and 10, wherein (FIG. 9) the pusher is shown fully retracted at the beginning of the cycle thereby allowing the pimiento strips 56 in the cartridge 10' to rest on the lower surface of the chute 27'. On the extending or pushing stroke of the pusher 26' the head 58 of the pusher engages the lowermost strip of pimiento and pushes it along chute 27' until it is fully stuffed into a pitted olive O' (FIG. 10) aligned with the chute 27' at that point in the cycle of the pusher mechanism. It is seen (FIG. 10) that the upper surface 58U of the pusher head supports the remaining pimiento 56 in the cartridge at all points in the pusher cycle except that point at which the pusher is fully retracted (FIG. 9) at which point the pimiento drops due to gravity into the chute 27'. In other words, the pusher removes the lowermost one of the strips of pimiento in the cartridge while supporting those remaining in the cartridge on the upper surface 58U of the head portion 58, thereby providing a method of stuffing edibles in rapid succession into previously pitted olives.

It is recognized by the applicant that the drying of pimiento so that it can be reconstituted in a liquid solution can be done in a number of ways. The drying can be done by freeze drying, heat drying, vacuum drying, or heat and vacuum drying. It is also recognized by applicant that edibles which are hard to handle other than pimiento, e.g., anchovies, can be dried before being placed in the feed cartridge thereby making them more manageable and improving the efficiency of the apparatus.

Although the best mode contemplated for carrying out the present invention has been herein shown and described, it will be apparent that modification and variation may be made without departing from what is regarded to be the subject matter of the invention.

What is claimed is:
1. A method of stuffing pitted olives with pimiento, comprising the steps of drying the pimiento until the moisture content therein is in the range of about 20% to about 2% to facilitate handling of said pimiento when stuffing said pimiento into pitted olives, stuffing said dried pimiento into the pit cavities of olives, and reconstituting said dried pimiento within the pitted olives by packing the stuffed olives in an aqueous solution.

2. The method of stuffing olives as described in claim 1 wherein a plurality of pimientos are folded upon a longitudinal line and overlapped in a series along the fold lines before the drying is completed so that the pimientos will bond together along the fold lines to form a single continuous strip of pimiento, and including the further step of slicing the dried pimientos into strips extending generally perpendicular to the fold lines before stuffing the strips of dried pimiento into the pit cavities of olives.

3. The method of stuffing pitted olives as described in claim 1 wherein said pimiento has a moisture content in the range of from approximately 2% to approximately 13% at the time of stuffing of the pimiento into the olives.

4. The method of stuffing pitted olives as described in claim 1 wherein said pimiento is dried until the moisture content therein is less than 5% so that it can be stored without spoilage before stuffing it into the olives.

5. The method of stuffing pitted olives as described in claim 4 including the further step of raising the moisture content of said dried pimiento to no more than about 20% before it is stuffed into the olives.

6. A method of stuffing pitted olives with strips of pimiento, comprising the steps of drying the pimiento to obtain a moisture content therein in the range of from about 20% to about 2% so that the surface texture and stiffness characteristics of said pimiento facilitate handling when subsequently slicing said pimiento into strips and stuffing the pimiento strips into pitted olives, slicing said dried pimiento into strips, stuffing said sliced strips into pitted olives, and reconstituting said strips of pimiento within the pitted olives by packing the stuffed olives in an aqueous solution.

7. A method of stuffing pitted olives with strips of pimiento comprising the steps of drying a quantity of pimiento to obtain a moisture content level in the pimiento in the range of from about 20% to about 2% moisture so that the surface texture and stiffness characteristics of the pimiento facilitate handling when subsequently slicing said pimiento into strips and stuffing said pimiento strips into pitted olives, guiding the dried pimiento in a longitudinal direction into a slicer with a feed cartridge, simultaneously laterally slicing said pimiento into strips while longitudinally advancing said pimiento in the slicer, stuffing said strips of pimiento into the pitted olives, and reconstituting said strips of pimiento within the pitted olives by packing said olives and strips in an aqueous solution.

* * * * *